United States Patent
Ortmann

(10) Patent No.: US 10,215,061 B2
(45) Date of Patent: Feb. 26, 2019

(54) INTERNAL COMBUSTION ENGINE

(71) Applicant: AUDI AG, Ingolstadt (DE)

(72) Inventor: Matthias Ortmann, Mönchengladbach (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/575,635

(22) PCT Filed: May 12, 2016

(86) PCT No.: PCT/EP2016/000785
§ 371 (c)(1),
(2) Date: Mar. 5, 2018

(87) PCT Pub. No.: WO2016/184557
PCT Pub. Date: Nov. 24, 2016

(65) Prior Publication Data
US 2018/0179919 A1    Jun. 28, 2018

(30) Foreign Application Priority Data

May 20, 2015 (DE) .......................... 10 2015 006 375

(51) Int. Cl.
*F01L 1/047* (2006.01)
*F16C 17/04* (2006.01)
(Continued)

(52) U.S. Cl.
CPC ............... *F01L 1/047* (2013.01); *F01L 1/46* (2013.01); *F16C 17/02* (2013.01); *F16C 17/045* (2013.01);
(Continued)

(58) Field of Classification Search
CPC ...... F16C 17/04; F16C 33/106; F16C 324/02; F16C 33/02; F16C 2360/18; F16C 17/02;
(Continued)

(56) References Cited

U.S. PATENT DOCUMENTS

| 2,930,114 A | * | 3/1960 | Erdmann | .............. B23P 19/084 |
| | | | | 221/312 A |
| 4,952,093 A | * | 8/1990 | Murakami | ............... B41J 29/02 |
| | | | | 403/261 |

(Continued)

FOREIGN PATENT DOCUMENTS

| DE | 3318175 A1 * | 11/1984 | ............. B65G 39/16 |
| DE | 3510389 A * | 9/1986 | ............. F16C 33/08 |

(Continued)

OTHER PUBLICATIONS

Notification of Transmittal of Translation of the International Preliminary Report on Patentability dated Nov. 30, 2017, in connection with corresponding international application No. PCT/EP2016/000785 (8 pgs.).

(Continued)

*Primary Examiner* — Marcus Charles
(74) *Attorney, Agent, or Firm* — Maier & Maier, PLLC

(57) ABSTRACT

An internal combustion engine with at least one camshaft and a bearing block for rotationally bearing the camshaft about a rotational axis, an axial bearing element being provided for axially bearing the camshaft, the element engaging with an axial bearing groove of the bearing block. The axial bearing element has a support body resting on an outer peripheral surface of the camshaft, and a retaining projection protruding from the support body, the projection engaging with a retaining recess passing through the outer peripheral surface, so that the axial bearing element is rotationally fixedly to the camshaft, the support body engaging with the peripheral axial bearing groove of the bearing block in the peripheral direction with respect to the rotational axis.

6 Claims, 1 Drawing Sheet

(51) Int. Cl.
*F16C 17/02* (2006.01)
*F16C 33/10* (2006.01)
*F16C 33/02* (2006.01)
*F01L 1/46* (2006.01)
*F16H 53/02* (2006.01)

(52) U.S. Cl.
CPC ..... *F16C 33/106* (2013.01); *F01L 2001/0476* (2013.01); *F16C 2360/18* (2013.01); *F16H 53/02* (2013.01)

(58) Field of Classification Search
CPC ......... F16H 53/02; F01M 9/102; F01L 1/047; F01L 1/46; F01L 2001/0476; F01L 2013/0052
USPC ............. 384/13, 29, 38, 172, 262, 266, 283; 29/243.56; 123/90.5; 403/256; D8/349
See application file for complete search history.

(56) References Cited

U.S. PATENT DOCUMENTS

| | | | | |
|---|---|---|---|---|
| 5,267,797 | A * | 12/1993 | Brandt | F16C 17/10 384/275 |
| 5,887,557 | A * | 3/1999 | Battlogg | F01L 1/047 123/90.17 |
| 6,212,746 | B1 * | 4/2001 | Cooks, Jr. | B23P 19/084 29/225 |
| 6,425,359 | B2 * | 7/2002 | Fujii | F01L 1/0532 123/90.17 |
| 6,637,778 | B2 * | 10/2003 | Benjey | B60K 15/03519 285/209 |
| 7,210,219 | B2 * | 5/2007 | Thal | B23P 19/084 29/229 |
| 8,776,746 | B2 * | 7/2014 | Scheidig | F01L 1/047 123/90.17 |
| D795,061 | S * | 8/2017 | Bacallao | D6/699.4 |
| 2010/0278467 | A1 * | 11/2010 | Hirose | B62D 3/12 384/283 |
| 2012/0008893 | A1 * | 1/2012 | Oishi | F16C 9/02 384/570 |
| 2016/0305291 | A1 * | 10/2016 | Weber | F01L 1/3442 |

FOREIGN PATENT DOCUMENTS

| | | | | |
|---|---|---|---|---|
| DE | 19525836 C1 * | 8/1996 | | F01L 1/34406 |
| DE | 10 2006 036 851 A1 | 6/2007 | | |
| DE | 10 2012 016 672 A1 | 2/2014 | | |
| DE | 10 2012 016 674 A1 | 2/2014 | | |
| DE | 10 2013 205 129 A1 | 9/2014 | | |
| DE | 102016001648 A1 * | 12/2016 | | F01L 1/047 |
| EP | 2817194 B1 * | 10/2017 | | |
| GB | 2378484 A * | 2/2003 | | F01L 1/047 |
| JP | 2005-90696 A | 4/2005 | | |
| WO | WO-0073673 A1 * | 12/2000 | | F16C 17/10 |
| WO | WO-2014071940 A1 * | 5/2014 | | F01L 13/0036 |

OTHER PUBLICATIONS

Examination Report dated Mar. 14, 2016 of corresponding German application No. 10 2015 006 375.8; 5 pgs.
International Search Report dated Oct. 17, 2016 of corresponding International application No. PCT/EP2016/000785; 15 pgs.

* cited by examiner

INTERNAL COMBUSTION ENGINE

FIELD

The invention relates to an internal combustion engine having at least one camshaft as well as a bearing block for rotationally bearing the camshaft about an axis of rotation, wherein an axial bearing element is provided for axially bearing the camshaft, this element engaging in an axial bearing groove of the bearing block.

BACKGROUND

The internal combustion engine serves to provide a torque. It possesses several cylinders, in each of which a lengthwise movable piston is arranged. Each cylinder is coordinated with at least one gas exchange valve, which is activated by means of the camshaft. The gas exchange valve may be present, for example, as a gas inlet valve or as a gas outlet valve. Preferably, the internal combustion engine possesses several camshafts, wherein one of the camshafts is provided to activate gas inlet valves and another of the camshafts is provided to activate gas outlet valves of the internal combustion engine. In the following, only one camshaft will be discussed, but the remarks, however, are also applicable to other camshafts of the internal combustion engine.

The camshaft is a component of a valve train. This may be designed as a variable valve train, for which the camshaft is preferably designed as a base camshaft, on which is arranged at least one cam carrier which is movable in the axial direction—with respect to an axis of rotation of the camshaft. Actuators are provided for the movement of the cam carrier. The cam carrier comprises at least two cams, wherein, in a first position of the cam carrier, a first of the cams is disposed to activate the gas exchange valve and in a second position that is different from the first position, a second of the cams is disposed to activate a specific gas exchange valve.

For the mounting of the camshaft with respect to a crankcase and/or a cylinder head of the internal combustion engine, especially for mounting on the cylinder crankcase or the cylinder head, the at least one bearing block is provided. This block is designed, for example, at least in regions, as a single piece and/or integrated materially with the cylinder crankcase or the cylinder head. The bearing block serves for the rotational bearing of the camshaft, thus, in particular, as a radial bearing. In order to furthermore secure the camshaft in the axial direction, the axial bearing element is provided, which engages in an axial bearing groove of the bearing block.

From the prior art, there is known the document DE 10 2012 016 674 A1, for example. This relates to a valve drive of an internal combustion engine having at least one base camshaft, especially one fashioned as a hollow shaft, on which at least one cam carrier is provided, being rotationally fixed and axially movable, wherein the base camshaft has a bearing seat arranged at least in regions in a divisible bearing, especially a plain bearing. In this case, a bearing race is provided, which engages in the radial direction in both a shaft recess of the base camshaft and in a bearing recess of the bearing.

Furthermore, the documents DE 10 2012 016 672 A1, DE 10 2006 036 851 A1 and DE 10 2013 205 129 A1 are known in the prior art.

SUMMARY

Now, the object of the invention is to propose an internal combustion engine having advantages over known internal combustion engines, in particular having an excellent continuous duty capability.

This is accomplished according to the invention with an internal combustion engine. It is provided here that the axial bearing element comprises a support body resting by its surface on an outer peripheral surface of the camshaft on both sides of a retaining projection up to as far as its free ends in the peripheral direction, wherein the retaining projection starts at the support body and engages in a retaining recess passing through the outer peripheral surface, so that the axial bearing element is rotationally fixed with the camshaft, while the support body engages in an axial bearing groove of the bearing block extending in the peripheral direction with respect to the axis of rotation.

Thus, the axial bearing element comprises at least the support body as well as the retaining projection. The support body is configured so that it lies against the outer peripheral surface of the camshaft, in particular, continuously in the peripheral direction. The support body accordingly has at least one inner peripheral surface, which lies against the outer peripheral surface of the camshaft for its entire surface, i.e., for example continuously in the peripheral direction and/or in the axial direction. The outer peripheral surface is preferably cylindrical, especially circular cylindrical. In particular, it preferably has a diameter corresponding to a maximum diameter of the camshaft. By the maximum diameter of the camshaft is meant the largest diameter present in the axial direction along the axis of rotation of the camshaft.

Preferably, therefore, the support body of the axial bearing element lies against an unslotted region of the outer peripheral surface of the camshaft.

In particular, the support body does not engage with the camshaft in the radial direction. With such a configuration, it is possible to avoid the unfavorable notch effect of a slot, which is formed in the known designs of the internal combustion engine in the camshaft for accommodating the axial bearing element or the support body.

In order to secure the support body or the axial bearing element with respect to the camshaft in the peripheral direction, i.e., to connect it to the latter in rotationally fixed manner, the retaining projection is provided. The latter extends inwardly in the radial direction, starting at the support body, and engages in this case in the retaining recess of the camshaft. The retaining recess has a circular round cross section and is accordingly configured as a retaining bore, for example. The retaining recess passes through the outer peripheral surface of the retaining shaft. The support body is advantageously configured such that it lies against the outer peripheral surface immediately adjoining the retaining recess in the peripheral direction, more preferably on both sides of the retaining recess. An operative force-transmitting or torque-transmitting connection between the camshaft and the axial bearing element preferably exists exclusively or at least almost exclusively by way of the retaining projection.

In order to secure the camshaft in the axial direction with respect to the bearing block, the latter has the axial bearing groove, which is designed continuously in the peripheral direction, and preferably comprises a groove bottom having the same distance from the axis of rotation continuously in the peripheral direction. As seen in the axial direction, the axial bearing groove preferably has the same dimensions as the support body or at least it is configured with a slight excess in relation to it. Accordingly, the support body of the axial bearing element is mounted rotatably about the axis of rotation in the axial bearing groove and is substantially secured in the axial direction, i.e., it is accommodated in it with no play or at best with slight play.

In another embodiment of the invention, it is provided that the camshaft is designed as a solid shaft or as a hollow shaft. Basically, both variants may be realized. In the case of the solid shaft, as seen in cross section, the camshaft is composed of of solid material, i.e., it has no cavity. But if the camshaft is present as a hollow shaft, then it has a cavity formed at its center and preferably symmetrical with respect to the axis of rotation, which more preferably passes entirely through the camshaft in the axial direction. With the design of the camshaft as a hollow shaft, the weight of the camshaft can be significantly reduced.

Based on the above-described axial bearing of the camshaft, the camshaft may be realized as a hollow shaft with no problem. For example, it is possible in this case to select the wall thickness of the hollow shaft, i.e., its thickness in the radial direction, such that it is smaller than the dimensions of the support body in the radial direction or at best slightly larger. For example, the wall thickness of the hollow shaft is at most 50%, at most 75%, at most 100%, at most 125% or at most 150% in regard to the dimensions of the support body in the radial direction, especially the maximum dimensions in the radial direction.

In another embodiment of the invention, another axial bearing element is provided, which is disposed on the camshaft diametrically opposite the axial bearing element and engaging by another retaining projection in another retaining recess of the camshaft to produce a rotationally fixed connection. The additional axial bearing element is accordingly present in addition to the above described axial bearing element. Preferably, the axial bearing element and the additional axial bearing element are designed as equal parts, i.e., they are identical. This enables a definite lowering of the manufacturing and warehousing costs, because the number of different parts being produced is reduced.

Like the axial bearing element, the additional axial bearing element is composed of the support body as well as the retaining projection, which shall be called hereinafter the additional support body and the additional retaining projection. The additional retaining projection engages with the additional retaining recess of the camshaft, in order to secure the additional axial bearing element in the peripheral direction relative to the camshaft. The additional retaining recess is preferably identical in configuration to the retaining recess, but arranged at a spacing from it, for example, in the peripheral direction. In particular, the additional retaining recess lies opposite the retaining recess in terms of the axis of rotation. Thanks to the identical configuration of the axial bearing element and the additional axial bearing element, these lie accordingly diametrically opposite each other.

An especially preferred embodiment of the invention calls for the axial bearing element and the additional axial bearing element to jointly enclose the camshaft entirely in the peripheral direction. For example, as seen in the peripheral direction, the support body lies both on a first side and also on a second side opposite the first side against the additional axial bearing element or its support body. The support body accordingly has two opposite-lying free ends in the peripheral direction. This is analogously the case for the additional axial bearing element and the additional support body. The support body now lies by one of its free ends against one of the free ends of the additional support body and by its other free end against the other free end of the additional support body.

In the context of another embodiment of the invention, it is provided that the retaining recess and the additional retaining recess lie diametrically opposite each other in the camshaft, in particular, they are configured as a common retaining recess passing entirely through the camshaft. Both the retaining recess and the additional retaining recess can each be present as a blind recess or blind bore, which is dimensioned in the radial direction relative to the axis of rotation such that it can just hold the support body of the specific axial bearing element. More preferably, however, the retaining recess is designed as a through recess, which passes entirely through the camshaft in the radial direction and accordingly forms the retaining recess and the additional retaining recess at the same time. Thus, the retaining recess and the additional retaining recess are present in the form of the single common retaining recess.

In another embodiment of the invention, it is provided that the support body is a partial circle and/or the retaining projection is round in cross section. Seen with respect to the axis of rotation in the cross section, the support body encloses the camshaft in the peripheral direction, at least partly. Accordingly, it has the shape of a partial circle and encloses at least 10%, at least 20%, at least 30%, at least 40%, at least 45%, at least 47.5%, or at least 50% of the camshaft in the peripheral direction. In addition, or alternatively, the retaining projection has the round cross section, i.e., it is round with respect to its longitudinal center axis.

Finally, in another preferred embodiment of the invention, it can be provided that the support body and/or the additional support body tapers in the direction of its free ends. As already explained above, the support body and the additional support body each have two opposite-lying free ends in the peripheral direction. The dimensions of the support body and of the additional support body in the axial direction and/or in the radial direction can now become smaller in the direction of the respective free end. While the tapering at the respective free end is preferably provided on both sides in the axial direction, the tapering in the radial direction preferably occurs only on the outer-lying side of the support body or of the additional support body in the radial direction. Thus, it is assured that the respective support body lies against the camshaft or its outer peripheral surface also in the region of its free end, especially along its entire extension in the peripheral direction.

BRIEF DESCRIPTION OF THE DRAWING

The invention shall be explained more closely below with the aid of exemplary embodiments represented in the drawing, without there being any limitation of the invention. Herein are shown.

DETAILED DESCRIPTION OF THE DRAWING

Figure 1:
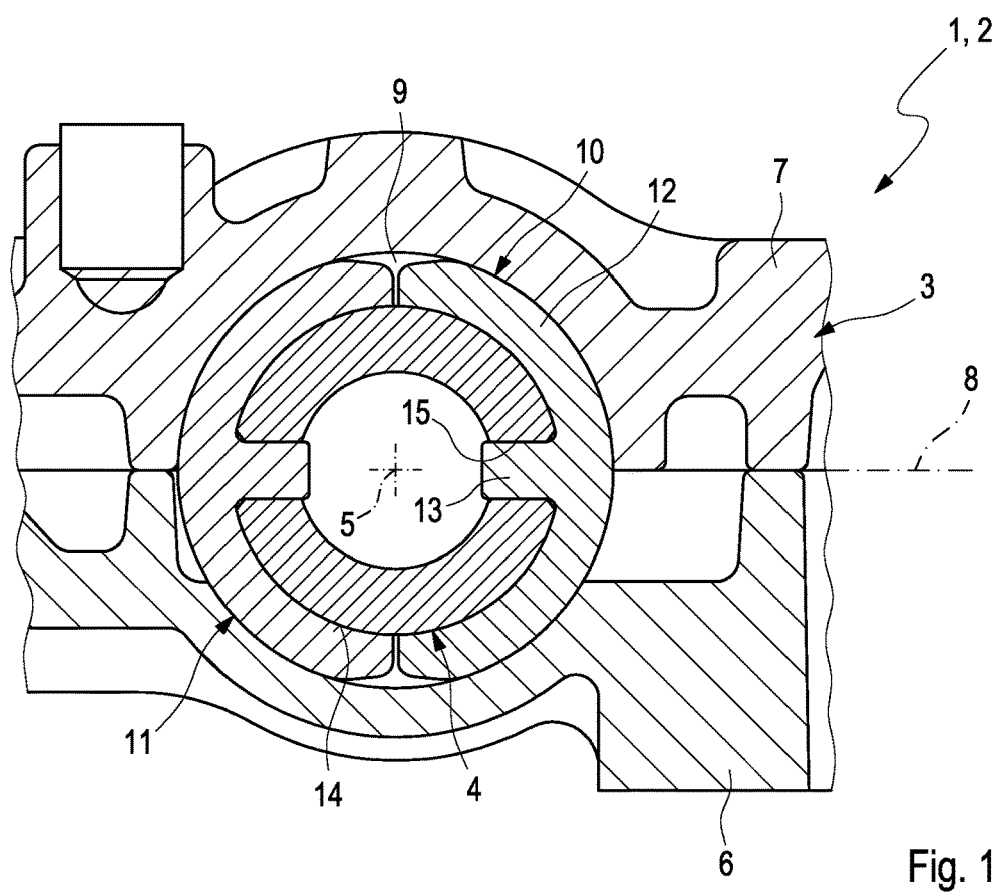
FIG. 1 a cross-sectional representation through a region of an internal combustion engine, and FIG. 2 an axial bearing element for the axial supporting of a camshaft of the internal combustion engine.

FIG. 1 shows a cross-sectional representation through a region of an internal combustion engine 1, especially through a region of a cylinder head 2 of the internal combustion engine 1. One notices a bearing block 3, which is provided for the bearing of a camshaft 4. The camshaft 4 is rotationally supported by means of the bearing block 3 with respect to an axis of rotation 5. The bearing block 3 has a multiple-piece design and preferably comprises a bearing block frame 6 as well as a bearing block cover 7. These lie against each other along a separating plane 8, the separating plane 8 preferably cutting the camshaft 4 down the middle and accordingly running through the axis of rotation 5. The bearing block 3 has an axial bearing groove 9, in which an axial bearing element 10 and an additional axial bearing element 11 engage. In the following, only the axial bearing element 10 shall be discussed, but the axial bearing element 11 is identical in design to the axial bearing element 10.

The axial bearing element 10 comprises a support body 12 as well as a retaining projection 13 proceeding from it. The support body 12 lies in the peripheral direction preferably continuously against an outer peripheral surface 14 of the camshaft 4. In the axial direction, adjacent or immediately adjacent to the axial bearing element 10, the camshaft 4 has the same diameter as in the region of its outer peripheral surface 14. Accordingly, no groove is provided for taking up the axial bearing element 10. The retaining projection 13 engages in a retaining recess 15, which passes preferably entirely through a wall of the camshaft 4, which in the exemplary embodiment represented here is present as a hollow shaft, i.e., it emerges into a central cavity of the camshaft 4. Preferably, the retaining projection 13 also extends in the radial direction into this central recess.

Figure 2:
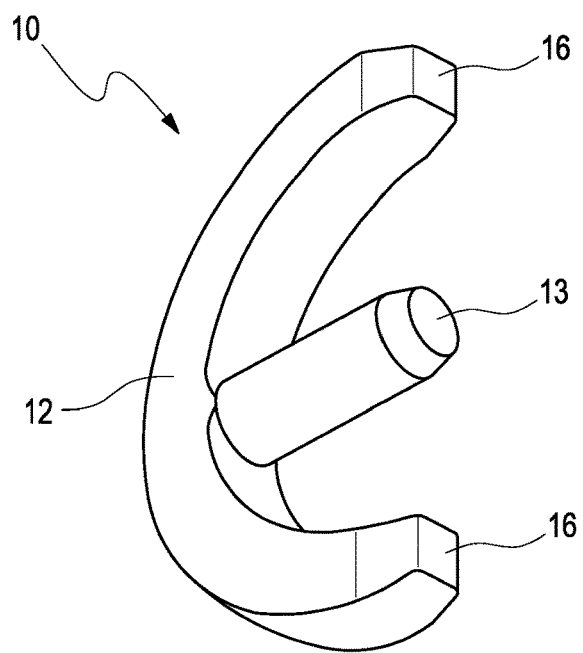

FIG. 2 shows a detail representation of the axial bearing element 10, the axial bearing element 11 having an identical design. It is clear that the support body 12 is substantially partially circular in shape, while the retaining projection 13 is round with respect to its longitudinal center axis in cross section. The support body 12 may taper in the direction of its free ends 16, this being provided especially in the axial direction. In addition, or alternatively, a tapering may occur in the radial direction, such a tapering being realized more preferably only on the outer-lying side of the support body 12 in the radial direction. Accordingly, the support body 12 may lie against the camshaft 4 by its surface on both sides of the retaining projection 13 in the peripheral direction up to as far as its free ends 16.

The invention claimed is:

1. An internal combustion engine comprising:
   at least one camshaft as well as a bearing block for rotationally bearing the camshaft about an axis of rotation, wherein an axial bearing element is provided for axially bearing the camshaft, this element engaging in an axial bearing groove of the bearing block, wherein the axial bearing element includes a support body resting on an outer peripheral surface of the camshaft as well as a retaining projection proceeding from the support body and engaging in a retaining recess passing through the outer peripheral surface, so that the axial bearing element is joined rotationally fixed to the camshaft, wherein the support body engages in the axial bearing groove of the bearing block extending in the peripheral direction with respect to the axis of rotation.

2. The internal combustion engine according to claim 1, wherein another axial bearing element, situated diametrically opposite the axial bearing element of the camshaft and engaged by another retaining projection in another retaining recess of the camshaft to produce a rotationally fixed connection.

3. The internal combustion engine according to claim 2, wherein the axial bearing element and an additional axial bearing element together surround the camshaft entirely in the peripheral direction.

4. The internal combustion engine according to claim 2, wherein the retaining recess and an additional retaining recess are situated diametrically opposite in the camshaft, in particular are configured as a common retaining recess passing entirely through the camshaft.

5. The internal combustion engine according to claim 1, wherein the support body has a partial circular shape and/or the retaining projection is round in cross section.

6. The internal combustion engine according to claim 1, wherein the support body and/or an additional support body taper in the direction of its free ends.

* * * * *